T. ABTMEYER.
ELECTRIC HEATING OR COOKING APPARATUS.
APPLICATION FILED MAY 13, 1909. RENEWED MAR. 21, 1910.
977,580.
Patented Dec. 6, 1910.
3 SHEETS—SHEET 2.
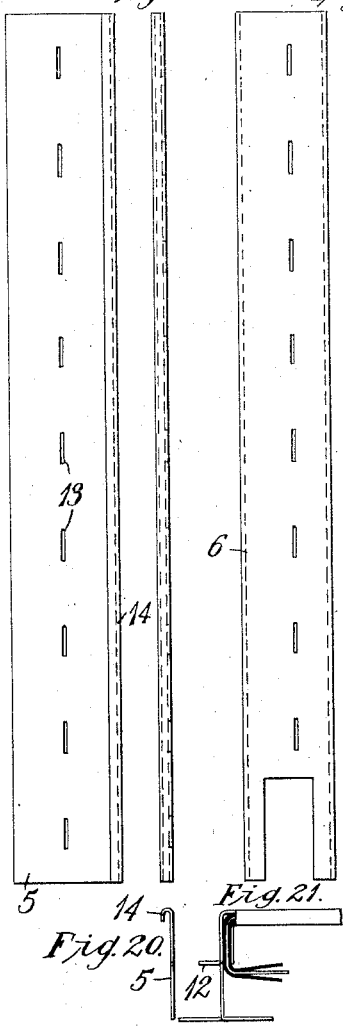
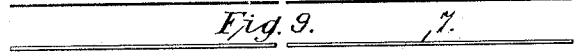
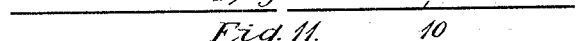
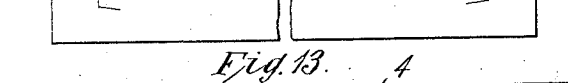
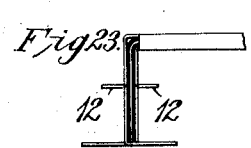
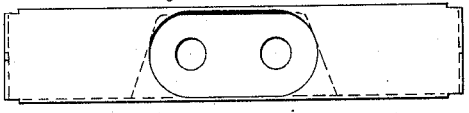
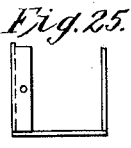
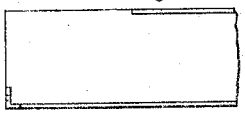
WITNESSES:
Fred H Miller
INVENTOR
Theodor Abtmeyer
BY
ATTORNEY T. ABTMEYER.
ELECTRIC HEATING OR COOKING APPARATUS.
APPLICATION FILED MAY 13, 1909. RENEWED MAR. 21, 1910.

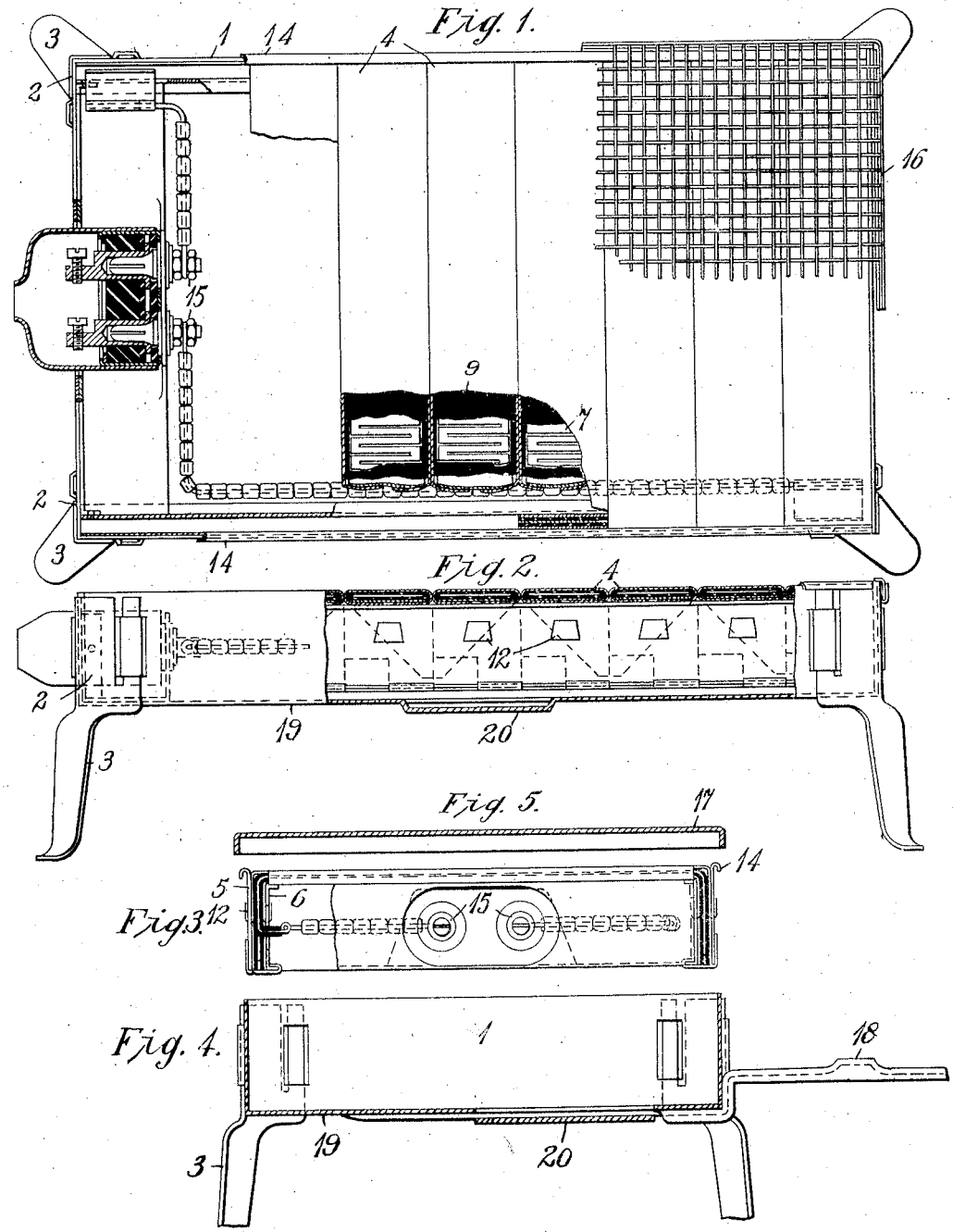

977,580.

Patented Dec. 6, 1910.

3 SHEETS—SHEET 3.

WITNESSES:

INVENTOR

BY

ATTORNEY

UNITED STATES PATENT OFFICE.

THEODORE ABTMEYER, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC HEATING OR COOKING APPARATUS.

977,580.     Specification of Letters Patent.     Patented Dec. 6, 1910.

Application filed May 13, 1909, Serial No. 495,810. Renewed March 21, 1910. Serial No. 550,790.

*To all whom it may concern:*

Be it known that I, THEODORE ABTMEYER, a citizen of the United States, and a resident of Wilkinsburg, in the county of Allegheny and State of Pennsylvania, have invented a new and useful Improvement in Electric Heating or Cooking Apparatus, of which the following is a specification.

My invention relates to electric heating or cooking apparatus, and it has special reference to such devices as are adapted for toasting slices of bread and for other similar heating and cooking purposes.

The object of my invention is to provide a device of the class above indicated that shall be simple and durable in construction and the parts of which may be composed of sheet metal stampings or punchings.

It is my aim to produce an inexpensive device which shall be adapted for toasting slices of bread with a minimum expenditure of time and electrical energy and without scorching the surface adjacent to the heater, and which may be utilized advantageously for other purposes, when desired.

The above mentioned results are secured by building the device from a number of sheet metal punchings; by minimizing heat radiation from the surfaces of the heating element which are not utilized in service, and by carefully distributing the resistance element over the heating area.

Figure 27:
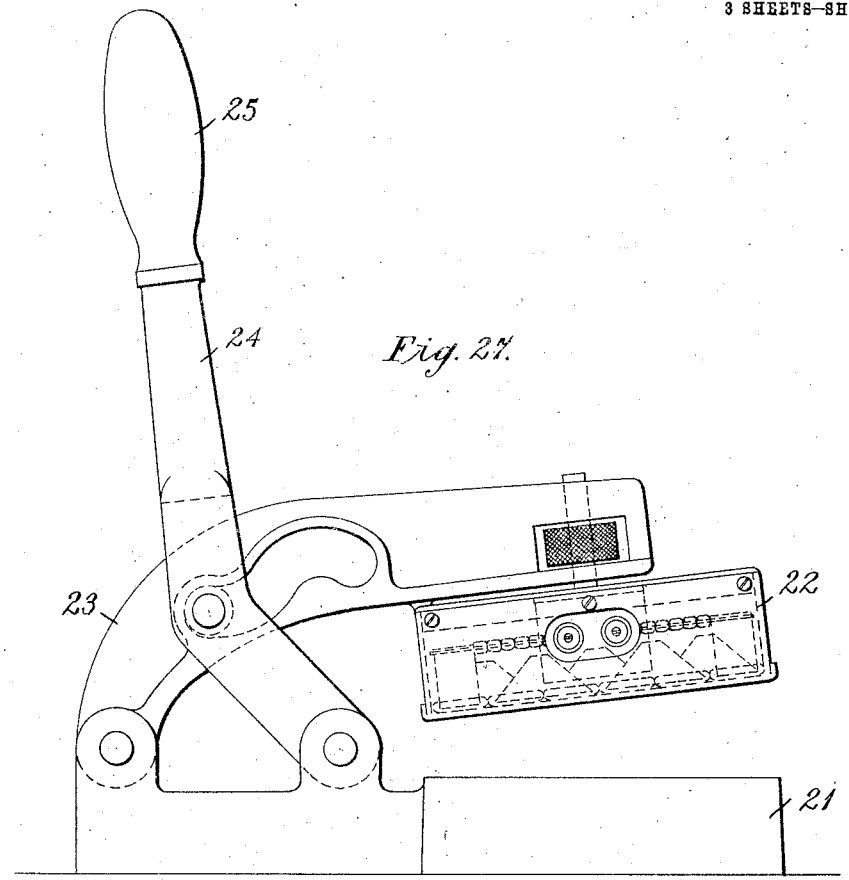
Figure 28:
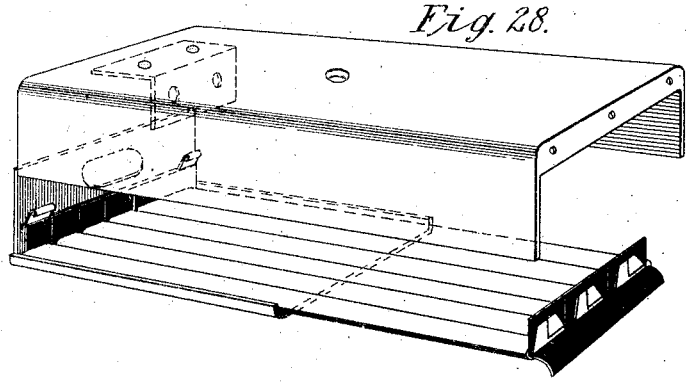

In the accompanying drawings, Figure 1 is a plan view of an electric toaster constructed in accordance with my invention, certain of the parts being broken away to disclose the elements of the device. Fig. 2 is a side elevation, Fig. 3 a sectional elevation and Fig. 4 an end elevation of the device shown in Fig. 1, parts being broken away and in section in each of said figures. Figs. 5 to 26, inclusive, are detail views of the structure shown in the preceding figures, and Figs. 27 and 28 are, respectively, an end elevation and a perspective view of a photograph-mounting press equipped with my invention.

Referring to Figs. 1 to 26, inclusive, the structure here illustrated comprises a frame or box 1 built up of strips that are stamped or punched from sheet metal and are provided with punched corner brackets 2 having downwardly extending projections 3 constituting legs on which the device rests, and a plurality of resistance units 4 that are so assembled edge to edge and secured to side strips 5 and 6, as shown in Figs. 16, 17, 18, 19, 20 and 22, that they constitute a cover member which is adapted to fit into the box 1.

Each of the resistance units comprises a strip or ribbon 7 having a plurality of lateral slots 8 cut alternately from opposite edges to provide a zig-zag path for the electric current (see Fig. 15), insulating strips or ribbons 9 placed against opposite sides of the resistance ribbon (see Figs. 8 and 10), a sheet metal strip 10 (see Figs. 11 and 12) which is placed against the insulating ribbon 9 of Fig. 10, and a strip or plate 11 (see Fig. 7) having projections that are adapted to lap over the strip 10. The electrical connection between adjacent units is accomplished, as shown in Figs. 14 and 15, by overlapping the ends of the resistance ribbons which are free from lateral slots and, consequently, have a relatively large current-conducting capacity.

After the units are assembled edge to edge and suitable electrical connections are established between them, the ends of the strips are bent at right angles to the working surface of the unit, as shown in Fig. 21. The units are then mechanically secured together by the side strips 5 and 6 which are assembled as shown in Fig. 3, the parts being shown in their proper relation but separated from each other in Figs. 20, 21 and 22.

The strips 10 and 11 are provided with projections 12 that are stamped out and extend through slots 13 in the side plates 5 and 6 and are afterward bent down to hold the parts in position. The projections 12 are assisted by the extreme ends of the top plates 11 which are slotted and are bent oppositely (see Fig. 21).

The assembled heating element is adapted to fit closely into the box 1 which forms part of the base of the device, a flange 14 on the side plates 5 extending over the edge of the box. The terminals of the resistance are connected to terminal members 15, which may be of any suitable design but are preferably in two parts to permit the external circuit conductors to be permanently secured to one part of a plug connector so that the device may be readily detached from the circuit.

It may be found desirable to provide a screen 16, as shown in Fig. 1, in order to separate the slices of bread or other articles to be toasted from direct contact with the heater units. An aluminum plate 17, such as that shown in Fig. 5, may be adapted to fit over the heating surface in order to form a smooth tray for cooking griddle cakes, and other attachments may be provided within the scope of my invention.

In order to devise means for lifting the device when hot and a ready means for turning cakes or slices of bread, I have so arranged and constructed a handle member 18 that it may be readily removed and present a thin edge to slide under the cooked articles of food. The bottom plate 19 of the outer box or frame 1 is provided with a punched offset 20 through which the blade of the handle member 18 extends.

Referring to Figs. 27 and 28, I have here shown an adaptation of my invention to a photograph-mounting press which comprises a base plate 21, an electrically heated press plate 22 coöperating therewith, an arm 23 to which the press plate 22 is secured and which is pivotally attached to the base plate 21, and a lever 24 having a handle 25 by which the movable parts may be operated. The structure of the movable press plate 22 is similar to that of the electric toaster of Figs. 1, 2 and 3, and the arrangement of parts is such that a card board or some other plate on which the photograph is to be mounted may be laid on the base plate, the photograph may then be placed in position with a filament of gum tissue between the two and finally the movable press plate may be brought into contact with the photograph to produce sufficient heat and pressure to soften the gum tissue and cause the photograph to adhere to the mount.

Other applications and adaptations of my improved heating structure may obviously be effected within the scope of my invention.

I claim as my invention:

1. An electric heating device comprising a plurality of resistance units each having a stamped or punched metal envelop and a frame to which said units are secured edge to edge.

2. An electric heating device comprising a frame, a plurality of resistance units secured thereto edge to edge, and a box or base into which the frame and the assembled units are fitted.

3. An electric toaster comprising a box or base having supporting feet, a frame having stamped or punched sheet metal side strips, and a plurality of resistance units arranged side by side and each unit secured at its ends to the punched side strips, said frame being fitted into said box or base.

4. An electric toaster comprising a box or base having supporting feet, a frame composed of stamped metal side and end strips, said side strips having a series of longitudinal slots, and a plurality of heater units arranged edge to edge, each of said units comprising a resistance ribbon, insulating strips and a punched or stamped sheet metal envelop the ends of which are bent down and folded over the side strips of the frame.

5. An electric toaster comprising a box or base having supporting feet, a frame composed of stamped metal side and end strips, said side strips having a series of longitudinal slots, and a plurality of heater units arranged edge to edge, each of said units comprising a resistance ribbon, insulating strips and a punched or stamped sheet metal envelop the ends of which are bent down and folded over the side strips of the frame, said resistance units being adapted to fit into said box or base.

6. An electric heating device comprising a plurality of units each composed of a resistance strip or ribbon, insulating strips assembled one on each side of the resistance ribbon, and a punched or stamped metal envelop, a rectangular supporting frame on which the resistance units are assembled edge to edge, said units being secured to the side strips at the ends of the stamped metal envelop, an electrical connection between units being established by folding over the adjacent ends of the resistance ribbons to be connected.

7. In an electric heating device, the combination with an electric heater element, a supporting box or base in which the element is disposed, of a handle member removably secured to the box or base, the end of the handle member opposite the handle grip being formed into a thin plate and sharpened at its edge to constitute a culinary utensil.

8. An electric heater comprising a frame and a plurality of flat and thin heater units disposed edge-to-edge in said frame and severally comprising a resistance element and a sheet metal envelop having a smooth unbroken outer side surface.

9. An electric heater comprising a frame and a plurality of heater units disposed edge-to-edge in a single plane and severally comprising a resistance element and a sheet metal envelop having an unbroken outer side surface.

10. An electric heater comprising a frame and a plurality of flat and thin heater units disposed edge-to-edge in a single plane and severally comprising a resistance element, insulating material and a sheet metal envelop having a smooth unbroken outer surface.

In testimony whereof, I have hereunto subscribed my name this 6th day of May, 1909.

THEODORE ABTMEYER.

Witnesses:
R. J. DEARBORN,
B. B. HINES.